G. W. LOGGIE.
CENTERING PIN CAP FOR TELESCOPES.
APPLICATION FILED APR. 9, 1910.

970,631.

Patented Sept. 20, 1910.

Witnesses:
Wm. J. Pike
Edward Maxwell

Inventor:
George W. Loggie,
by Geo. W. Maxwell,
Attorney.

UNITED STATES PATENT OFFICE.

GEORGE W. LOGGIE, OF SOMERVILLE, MASSACHUSETTS, ASSIGNOR TO KINKEAD MANUFACTURING COMPANY, OF BOSTON, MASSACHUSETTS, A CORPORATION OF MASSACHUSETTS.

CENTERING-PIN CAP FOR TELESCOPES.

970,631.  Specification of Letters Patent.  Patented Sept. 20, 1910.

Application filed April 9, 1910. Serial No. 554,524.

*To all whom it may concern:*

Be it known that I, GEORGE W. LOGGIE, a citizen of the United States, and resident of Somerville, in the county of Middlesex and State of Massachusetts, have invented an Improvement in Centering-Pin Caps for Telescopes, of which the following description, in connection with the accompanying drawings, is a specification, like letters on the drawings representing like parts.

My invention is a special centering device to be applied on a telescope at one end thereof, preferably in front of the objective end, for use in connection with sighting apparatus for very short distances.

In using various kinds of instruments of precision, such as a level, or transit, for example, in places where the range is very short, as for example when alining shafting, great inconvenience is often experienced in locating a target properly (for example after the instrument has been set with reference to a distant object or target), because the place where it is desired to have this near target is closer to the instrument than can be viewed by the latter. Accordingly, I provide a center-indicating means, which does not interfere with the usual use of the telescope as a sighting medium and yet coöperates with the telescope in enabling the user to locate his target close to the instrument and yet accurately with relation to the axial center of the telescope, while leaving the instrument undisturbed in its original set up position.

In the preferred embodiment of my invention, this centering means consists simply of a cap for the objective, provided with an external projecting centering pin, although it will be understood that my invention is broadly novel and can be embodied in a wide range of mechanical forms.

Figure 1:
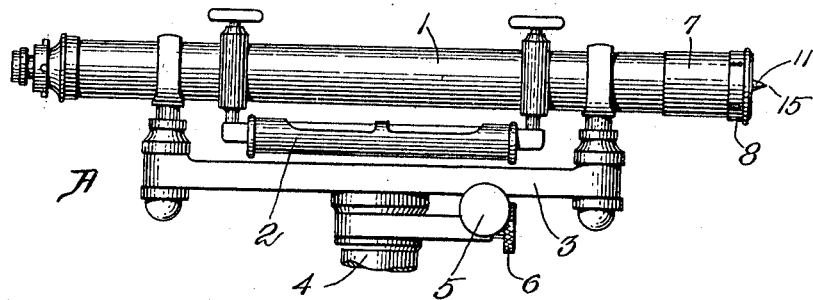
Figure 2:
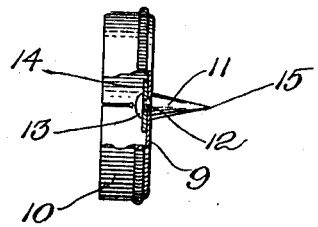
Figure 3:
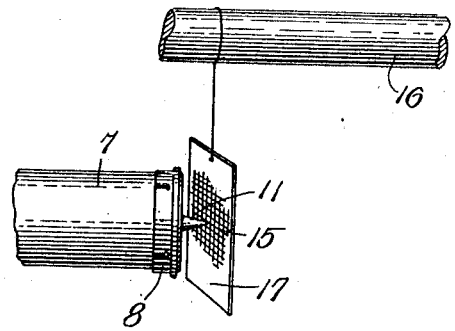

In the accompanying drawings, in which I have shown this preferred embodiment of my invention, Figure 1 is a view in side elevation, partly broken away, showing my invention applied to the telescope of a surveyor's level; Fig. 2 is an enlarged view in side elevation, partly in section, showing the cap alone; and Fig. 3 is a fragmentary view showing the device in side elevation and illustrating in perspective one form of target in its relation thereto as in use.

The instrument shown is merely illustrative of the general use and relation of my invention to instruments of precision, a surveyor's level A being herein shown for convenience of illustration and description.

The telescope 1 and spirit level 2, adjustably carried by said telescope, are supported above a usual base 3 mounted on a post 4 for pivotal adjustment by an adjusting screw 5 and normally held by a clamping screw 6. On the objective end 7 of the telescope, I mount a closing cap 8 having a front transverse end 9 and lateral peripheral flange 10. At the center of the front end or top 9 of the cap, I secure a tapering center-point 11, herein shown as provided with a narrow neck 12 riveted at 13 over a securing washer 14 and terminating in a sharp centering point 15 lying in the axis of the telescope when the cap is in place as shown in Figs. 1 and 3.

In use, the cap is first removed from the telescope the same as any other cap, and then the engineer sights the distant object with relation to which the shaft 16, for instance, or other object is to be alined or positioned. The instrument is then adjusted accurately as may be required by the given problem, with reference to the object sighted. Having thus adjusted the instrument and clamped the same immovable, the centering cap is put over one end of the telescope, preferably, as here shown, the objective end thereof, this end being preferred to the opposite end because it is more convenient, and then the target 17 is adjusted from any suitable point until the required spot of said target comes against or opposite the point 15 of the centering device, whereupon the engineer secures his target in said adjusted position. This gives him at once the means of locating the object which is being placed or which has been placed. For example, it gives him the data from which to determine the position of the shaft at the region thereof adjacent the target 17.

I have shown a suspended target, but it will be understood that any other kind of target may be employed. I have not deemed it necessary to explain the special kind of target commonly used for alining shafting, nor to explain the system of working out such a problem by the use of such targets, inasmuch as this system is known to engineers, and is only one of the uses to which my invention may be applied.

Having described my invention, what I claim as new, and desire to secure by Letters Patent is:

1. The combination with a telescope, of a centering device located in the axial line of the telescope.

2. The combination with a telescope, of a centering device removably located in the axial line of the telescope.

3. The combination with a telescope, of a centering device carried by a removable cap fitting one end of the telescope.

4. The combination with a telescope, of a centering device carried by the objective cap of the telescope.

5. A telescope objective cap, having a centering pin rigidly projecting from its center.

6. A flanged cap, provided with a rigidly projecting conical center pin having its apex in line with the longitudinal axis of the cap.

In testimony whereof, I have signed my name to this specification, in the presence of two subscribing witnesses.

GEORGE W. LOGGIE.

Witnesses:
 WM. J. PIKE,
 EDWARD MAXWELL.